United States Patent
Patil et al.

(10) Patent No.: US 10,237,188 B2
(45) Date of Patent: Mar. 19, 2019

(54) REGULATING RESPONSES BASED ON REQUEST ADDRESSING OR REQUEST CHANNELS

(71) Applicant: QUALCOMM Incorporated, San Diego, CA (US)

(72) Inventors: Abhishek Pramod Patil, San Diego, CA (US); Santosh Paul Abraham, San Diego, CA (US); Jouni Kalevi Malinen, Tuusula (FI); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 15/405,165

(22) Filed: Jan. 12, 2017

(65) Prior Publication Data

US 2017/0208006 A1    Jul. 20, 2017

Related U.S. Application Data

(60) Provisional application No. 62/427,740, filed on Nov. 29, 2016, provisional application No. 62/279,550, filed on Jan. 15, 2016.

(51) Int. Cl.
| | | |
|---|---|---|
| *H04L 12/26* | (2006.01) | |
| *H04L 12/803* | (2013.01) | |
| *H04L 12/24* | (2006.01) | |
| *H04W 48/16* | (2009.01) | |
| *H04W 48/20* | (2009.01) | |
| *H04W 84/12* | (2009.01) | |

(Continued)

(52) U.S. Cl.
CPC ............ *H04L 47/125* (2013.01); *H04L 41/50* (2013.01); *H04W 48/16* (2013.01); *H04W 48/20* (2013.01); *H04W 84/12* (2013.01); *H04W 88/02* (2013.01); *H04W 88/08* (2013.01)

(58) Field of Classification Search
CPC ...... H04L 41/50; H04L 47/125; H04W 48/16; H04W 48/20; H04W 84/12; H04W 88/02; H04W 88/08; H04W 8/26
See application file for complete search history.

(56) References Cited

U.S. PATENT DOCUMENTS

| | | | |
|---|---|---|---|
| 7,949,358 B2 * | 5/2011 | Wentink | ............... H04W 8/005 455/434 |
| 8,873,494 B2 | 10/2014 | Cherian et al. | |
| 9,185,725 B2 | 11/2015 | Kneckt et al. | |

(Continued)

OTHER PUBLICATIONS

International Search Report and Written Opinion—PCT/US2017/013526—ISA/EPO—dated Apr. 21, 2017.

*Primary Examiner* — Minh Trang T Nguyen
(74) *Attorney, Agent, or Firm* — Arent Fox, LLP

(57) ABSTRACT

A method, an apparatus, and a computer-readable medium for wireless communication are provided. The apparatus may be configured to transmit a request message to a plurality of access points. The request message may include an address reserved for at least one of an access point feature, an access point service, or an access point vendor. The apparatus may be configured to receive a response message from at least one access point of the plurality of access points. The response message may indicate that the at least one access point has the access point feature, is associated with the access point service, or is associated with the access point vendor.

30 Claims, 12 Drawing Sheets

(51) Int. Cl.
*H04W 88/02* (2009.01)
*H04W 88/08* (2009.01)

(56) References Cited

U.S. PATENT DOCUMENTS

| | | | |
|---|---|---|---|
| 2007/0243888 A1* | 10/2007 | Faccin | H04W 48/14 455/461 |
| 2008/0298333 A1* | 12/2008 | Seok | H04W 8/005 370/338 |
| 2009/0245133 A1* | 10/2009 | Gupta | H04W 48/14 370/254 |
| 2010/0271938 A1* | 10/2010 | Mutoh | H04L 12/4604 370/228 |
| 2013/0231151 A1 | 9/2013 | Kneckt et al. | |
| 2013/0281056 A1 | 10/2013 | Abraham et al. | |
| 2014/0313929 A1 | 10/2014 | Qi et al. | |
| 2016/0165519 A1 | 6/2016 | Abraham | |
| 2016/0316395 A1 | 10/2016 | Chen et al. | |
| 2016/0344823 A1 | 11/2016 | Flick et al. | |

* cited by examiner

REGULATING RESPONSES BASED ON REQUEST ADDRESSING OR REQUEST CHANNELS

CROSS-REFERENCE TO RELATED APPLICATION(S)

This application claims the benefit of U.S. Provisional Application Ser. No. 62/279,550, entitled "REGULATING PROBE RESPONSES BASED ON PROBE REQUEST ADDRESSING OR PROBE REQUEST CHANNELS" and filed on Jan. 15, 2016, and U.S. Provisional Application Ser. No. 62/427,740, entitled "REGULATING RESPONSES BASED ON REQUEST ADDRESSING OR REQUEST CHANNELS" and filed on Nov. 29, 2016, which are expressly incorporated by reference herein in their entirety.

BACKGROUND

Field

The present disclosure relates generally to communication systems, and more particularly, to regulating responses based on request addressing and request channels.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus for wireless communication. The apparatus may be configured to transmit a request message to a plurality of access points. The request message may include an address reserved for requesting or discovering at least one of an access point feature, an access point service, or an access point vendor. The apparatus may be configured to receive a response message from at least one access point of the plurality of access points based on the transmitted request message. The response message may indicate that the at least one access point has the access point feature, provides the access point service, or is associated with the access point vendor.

Another aspect of this disclosure provides a method for wireless communication by a station. The method may include determining to discover whether a service is available on a network and monitoring a channel associated with the service to determine whether the service is available on the network. In an aspect, the service may include an access point service, an access point feature, or an access point vendor. In another configuration, the determining to discover may include determining the service to be discovered on the network and selecting the channel associated with the service from a set of channels. In this configuration, the information may indicate the availability of the service is reserved for transmission on the channel when the service is available on the network. In another aspect, the set of channels includes one or more 20 megahertz (MHz) channels in a 5 gigahertz (GHz) band, and each 20 MHz channel may be associated with a different service. In another aspect, the channel may be different from a current operating channel of an access point advertising the service. In another configuration the monitoring the channel may include receiving a transmission on the channel and determining whether the received transmission indicates that the service is available on an access point within the network.

Another aspect of this disclosure provides an apparatus for wireless communication. The apparatus may include means for determining to discover whether a service is available on a network and means for monitoring a channel associated with the service to determine whether the service is available on the network. In an aspect, the service may include an access point service, an access point feature, or an access point vendor. In another configuration, the means for determining to discover may be configured to determine the service to be discovered on the network and to select the channel associated with the service from a set of channels. The information may indicate the availability of the service is reserved for transmission on the channel when the service is available on the network. In another aspect, the set of channels includes one or more 20 MHz channels in a 5 GHz band, and each 20 MHz channel may be associated with a different service. In another aspect, the channel may be different from a current operating channel of an access point advertising the service. In another configuration, the means for monitoring the channel may be configured to receive a transmission on the channel and to determine whether the received transmission indicates that the service is available on an access point within the network.

Another aspect of this disclosure provides an apparatus for wireless communication. The apparatus may include a memory and at least one processor coupled to the memory. The at least one processor may be configured to determine to discover whether a service is available on a network and to monitor a channel associated with the service to determine whether the service is available on the network. In another aspect, the service may include an access point service, an access point feature, or an access point vendor. In another configuration, the at least one processor may be configured to determine to discover by determining the service to be discovered on the network and by selecting the channel associated with the service from a set of channels. The information indicating the availability of the service may be reserved for transmission on the channel when the service is available on the network. In another aspect, the set of channels may include one or more 20 MHz channels in a 5 GHz band, and each 20 MHz channel may be associated with a different service. In another aspect, the channel may be different from a current operating channel of an access point advertising the service. In another configuration, the at least one processor may be configured to monitor the channel by receiving transmissions on the channel and by determining whether the received transmission indicates that the service is available on an access point within the network.

Another aspect of this disclosure provides a computer-readable medium storing computer executable code. The computer-readable medium may include code to determine to discovery whether a service is available on a network and to monitor a channel associated with the service to determine whether the service is available on the network.

DETAILED DESCRIPTION

Figure 1:
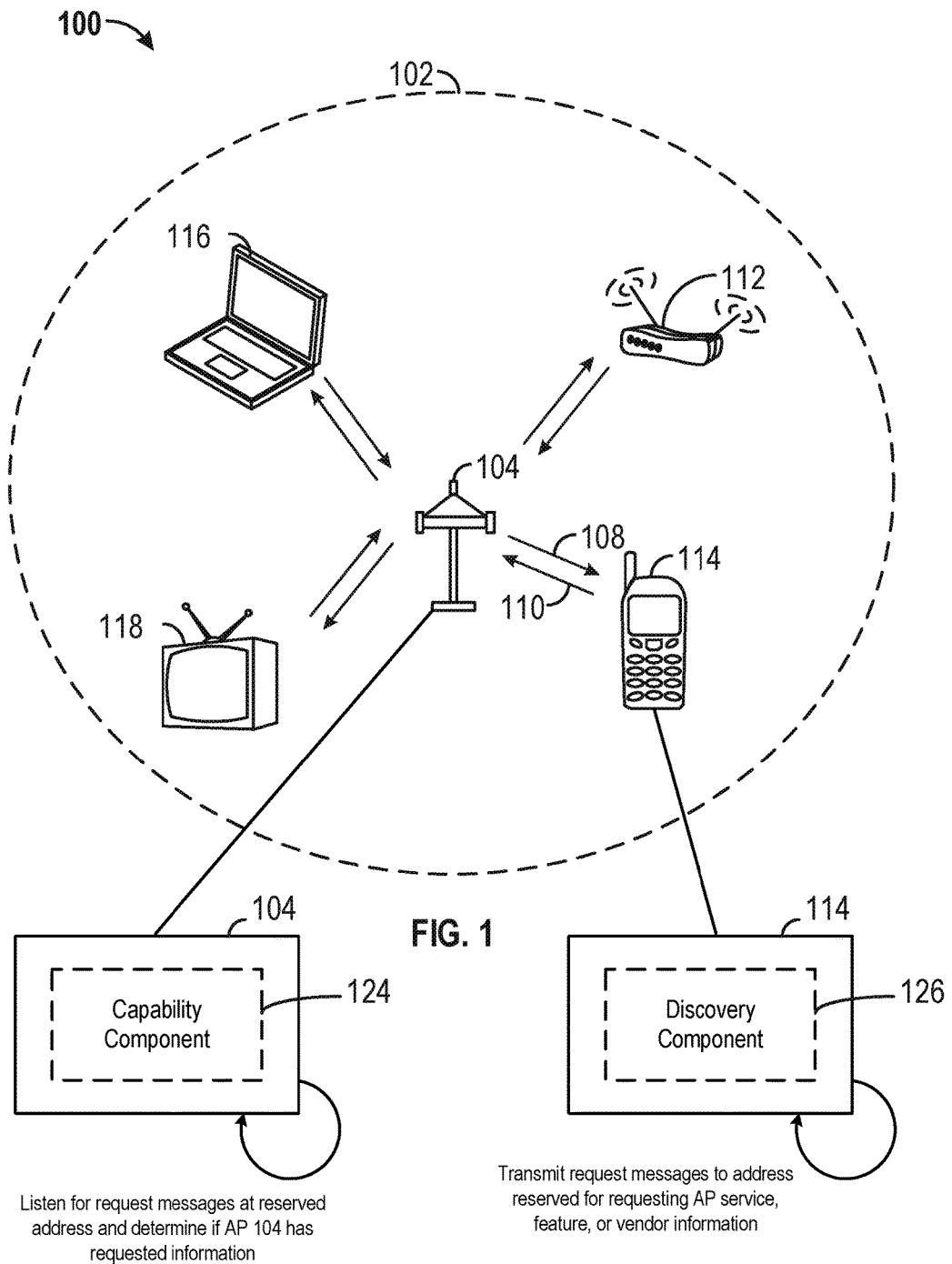
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a capability component 124 to perform procedures related to enabling the discovery of features and services supported by the AP 104. In this example, the capability component 124 may be configured to receive a request (e.g., a probe request or a generic advertisement service frame) that includes an address reserved for discovering access points associated with at least one of an access point feature, an access point service, or an access point vendor. The capability component 124 may be configured to determine whether the AP 104 is associated with the access point feature, the access point service, or the access point vendor that is identified by the address. If the AP 104 has the access point feature, supports the access point service, or is associated with the access point vendor, then the capability component 124 may be configured to transmit, based on the determination, a response indicating that the AP 104 has the access point feature, supports the access point service, or is associated with the access point vendor.

In another aspect, the STA 114 may include one or more components for performing various functions. For example, the STA 114 may include a discovery component 126 to perform procedures related to regulating responses based on a request address or request channels. In one configuration, the discovery component 126 may be configured to transmit a request message to a number of access points. The request message may include an address reserved for requesting at least one of an access point feature, an access point service, or an access point vendor. The discovery component 126 may be configured to receive a response message from at least one access point of the number of access points. The response message may indicate that the at least one access point has an access point feature, supports an access point service, or is associated with an access point vendor.

Figure 2:
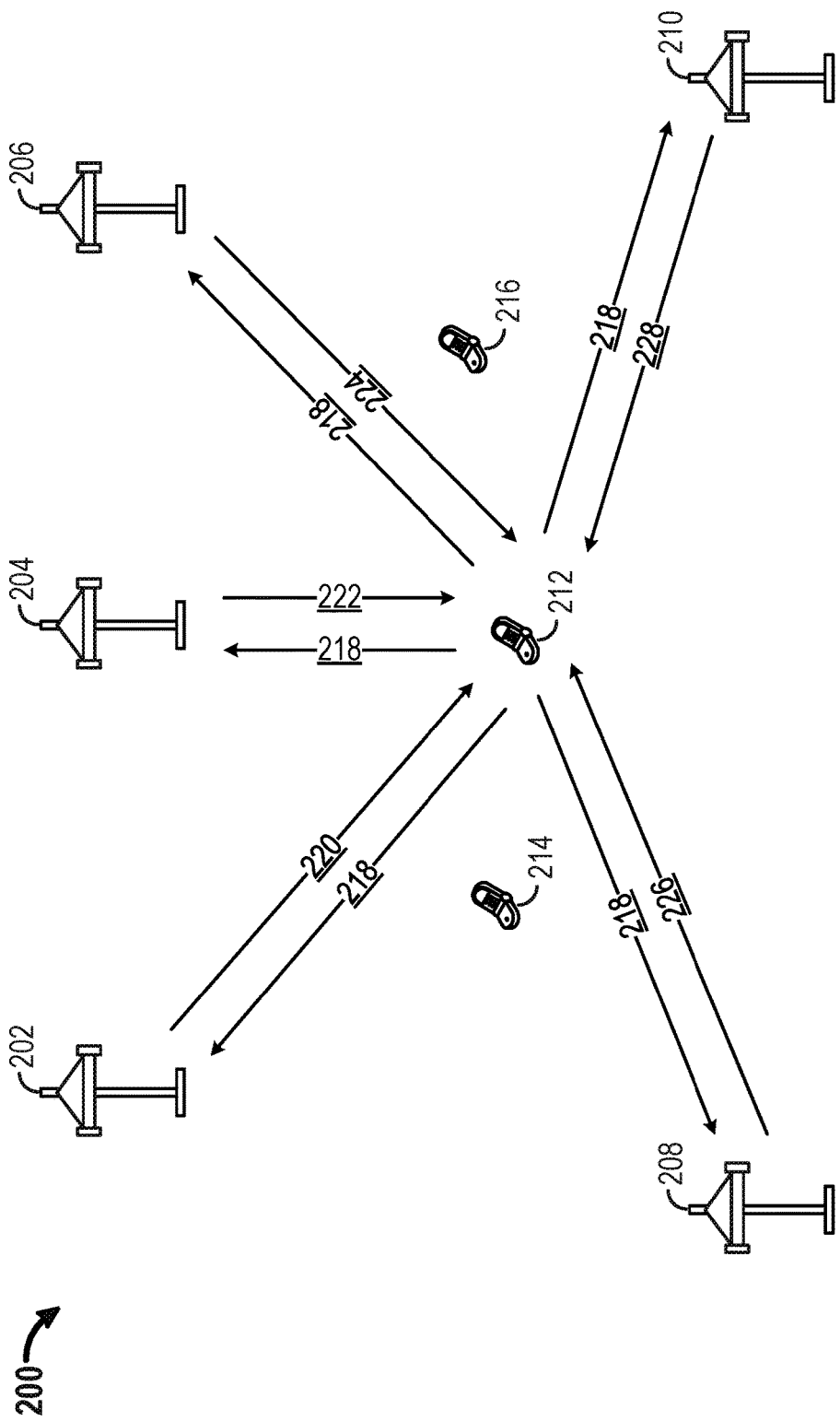
FIG. 2 illustrates a wireless network (e.g., a Wi-Fi network) with multiple APs.

FIG. 2 illustrates a wireless network 200 (e.g., a Wi-Fi or WLAN network) with multiple APs. Referring to FIG. 2, a first AP 202, a second AP 204, a third AP 206, a fourth AP 208, and a fifth AP 210 are deployed within the wireless network 200. Any other number of APs may also be deployed within the wireless network. STAs 212, 214, 216 (and/or other STAs) may also be within the wireless network 200. In an aspect, the STA 212 may transmit a probe request 218 (e.g. broadcast a probe request) to discover an AP that may support a specific feature or capability or to discover an AP that may be associated with a particular vendor (e.g., manufacturer or brand). The probe request 218 may be addressed to a well-known broadcast address (e.g., 0xFFFFFFFFFFFF) to which all APs are preconfigured to respond, even if the APs do not understand the request (e.g., the request includes a new information element that cannot be decoded by the AP). Referring to FIG. 2, upon receiving the probe request 218, the first AP 202 may respond with a first probe response 220, the second AP 204 may respond with a second probe response 222, the third AP 206 may respond with a third probe response 224, the fourth AP 208 may respond with a fourth probe response 226, and the fifth AP 210 may respond with a fifth probe response 228. Probe responses, and other management frames, may be sent at a low data rate. As such, multiple APs responding to a probe request may create a lot of content, packet collision, and/or medium congestion. Although FIG. 2 only illustrates the STA 212 transmitting probe requests, the STAs 214, 216 may also transmit probe requests, which may, in turn, lead to additional probe responses from the APs. The problem of collision and congestion may be especially severe in areas where a large number of APs and/or STAs are located (e.g., in airports or other densely populated areas). The large amount of network traffic diminishes network performance and may bring down the overall throughput of the wireless network 200. Therefore, a need exists to reduce the congestion due to probe response (or other responses) arising from probe requests (or other requests).

Figure 3A:
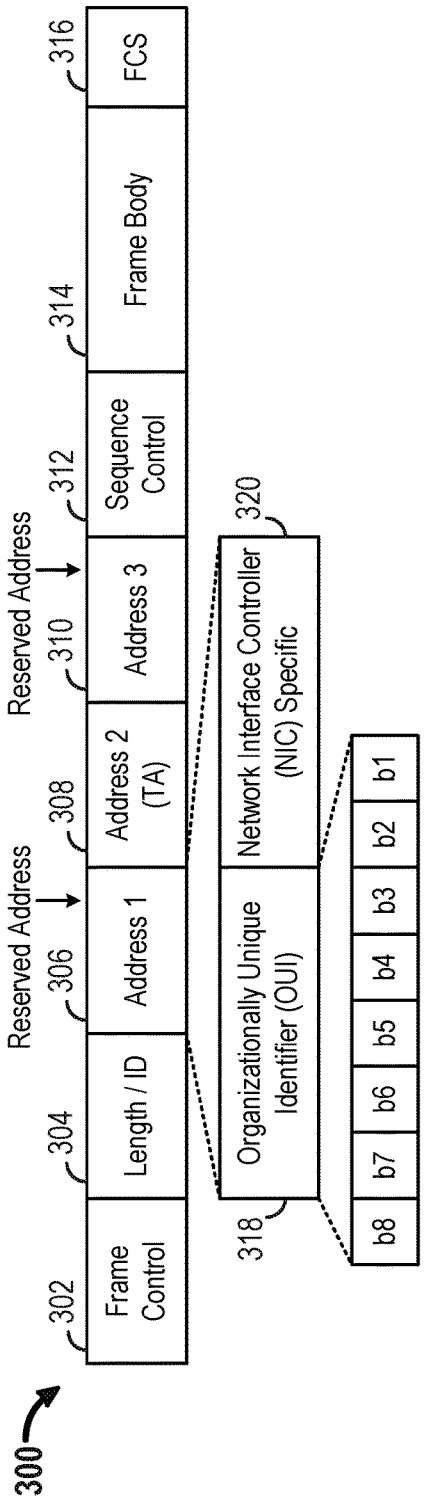
FIGS. 3A-B illustrate exemplary frames that include an address reserved for discovering a feature, a service, or an access point associated with a vendor.
Figure 3B:
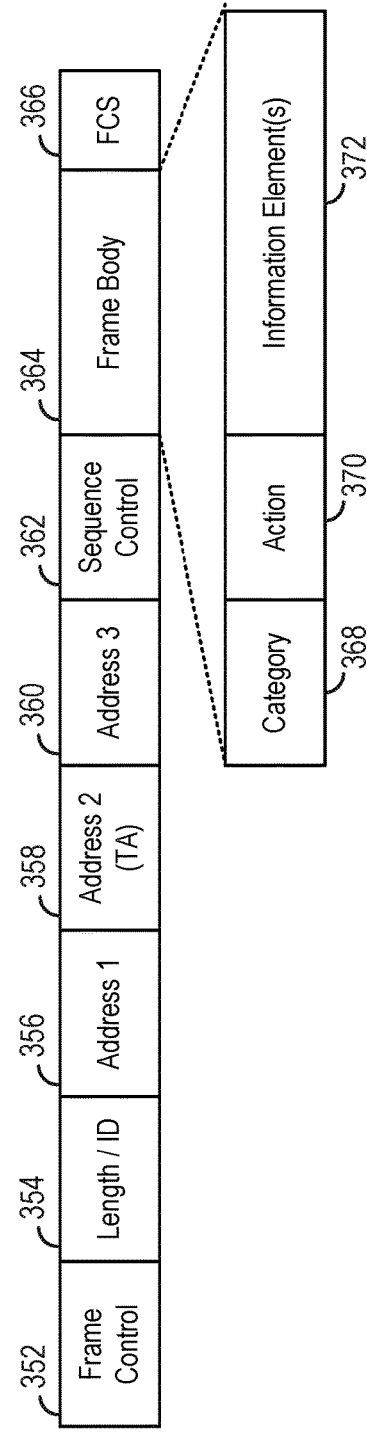

FIGS. 3A-B illustrate exemplary frames that include an address reserved for discovering a feature, a service, or an access point associated with a vendor. FIG. 3A illustrates an exemplary probe request frame 300 for regulating probe responses. The probe request frame 300 may include a frame control field 302, a length field 304, a first address field (address 1) 306, a second address field (address 2) 308, a third address field (address 3) 310, a sequence control field 312, a frame body field 314, and a frame check sequence (FCS) field 316. The frame control field 302 may include control information related to the probe request frame 300. The length field 304 may indicate the duration (e.g., in microseconds) of the probe request frame 300 following the length field 304.

The first address field 306 may, in one configuration, include a receiver address of the intended recipient of the probe request frame 300. In this configuration, the receiver address may include the well-known broadcast probe address (e.g., 0xFFFFFFFFFFFF) to which all APs will respond. In another configuration, the well-known broadcast address may be replaced with an address (e.g., a MAC address) that is reserved for querying an access point feature, an access point service, and/or an access point vendor. In one example, the address may be reserved for discovering a device cluster in a neighborhood aware network (NAN). A wireless device looking for a NAN cluster may transmit the probe request frame 300 with the address to determine if the NAN cluster is nearby. In another example, IEEE 802.11ai or the Wi-Fi Alliance (WFA) Optimized Connectivity Experience (OCE) may reserve one or more addresses, and a wireless device compatible with IEEE 802.11ai or WFA OCE may transmit the probe request frame 300 that includes the address to discover IEEE 802.11ai/OCE capable APs. In another example, the address may be reserved for discovering APs that support certain features or protocols. For example, an address may be reserved for APs that support IEEE 802.11ac, a particular channel bandwidth (e.g., 80 megahertz (MHz) or 160 MHz), a number of spatial streams, and/or a particular data rate or modulation and coding scheme (MCS). In another aspect, an IEEE 802.11aq compatible STA may transmit the probe request frame 300 with an address reserved for querying nearby APs for a specific service or set of services. APs compatible with IEEE 802.11aq and that offer the service or set of services may respond to the probe request frame 300. APs that do not recognize the address, do not have the feature, do not offer the service, or are not associated with the requested vendor, may not respond to a probe request directed to the reserved address. In an aspect, APs that respond may respond via unicast or broadcast/multicast. When an AP responds using broadcast or multicast, other STAs looking to discover the same service, etc. may not need to transmit a probe request. Further, as shown in FIG. 3A, the first address field 306 may include a group bit (e.g., b1), which may be set to 0 when the probe request frame 300 is meant for unicast transmission and may be set to 1 when the probe request frame 300 is meant for multicast or broadcast transmission. The second address field (address 2) may include the address of the wireless device (e.g., a STA) transmitting the probe request frame 300.

The third address field 310 may, in one configuration, include the basic service set identifier (BSSID). In another configuration, the BSSID may be replaced with the address that is reserved for querying an access point feature, an access point service, or an access point vendor. When the third address field 310 is replaced with the reserved address, APs receiving the probe request frame 300 may determine that the probe request frame 300 is a request to discover APs that have a particular capability, offer a particular service, or are associated with a particular vendor. APs that do not recognize the address, or do not have the feature, do not offer to service or are not associated with the requested vendor, may not respond to the probe request frame 300 that includes the reserved address in the third address field 310. Further, similar to the first address field 306, the third address field 310 may include a group bit, which may be set to 0 or 1, to indicate a type of transmission (e.g., unicast or multicast/broadcast).

The sequence control field 312 may include a sequence number associated with data transmitted in the frame body field 314. In the probe request frame 300, the frame body field 314 may include additional information related to the probe request. In one aspect, if the reserved address included in the first address field 306 and/or the third address field 310 identifies a category or set of services requested, the frame body field 314 may include additional information related to specific services within the category or set of services requested. For example, if the reserved address is a query for board games, the frame body field 314 may identify specific board games queried via the probe request frame 300. In another aspect, if the reserved address included in the first and/or third address field 306, 310 identifies a feature, the frame body field may include additional features queried. For example, the reserved address may indicate a query for APs that support IEEE 802.11ac (or a future Wi-Fi standard), and the frame body field may include queries for further features such as support for 160 MHz channel bandwidths and multiple spatial streams. APs that do not include support the 306, 310 features indicated via the reserved address and the frame body field 314 may not respond to the probe request frame 300. In another aspect, if the reserved address included in the first and/or third address field identifies a particular vendor, then APs not associated with the vendor may not respond to the probe request frame 300.

Although FIG. 3A depicts the reserved address included within the probe request frame 300, the reserved address may be included within any kind of frame, including any management frame, such as an action frame or a public action frame (frames that allow communications between an AP to unassociated-STAs). An example of an action frame is illustrated in FIG. 3B, which depicts an exemplary generic advertisement service (GAS) frame 350. The GAS frame 350 may include a frame control field 352, a length field 354, a first address field (address 1) 356, a second address field (address 2) 358, a third address field (address 3) 360, a sequence control field 362, a frame body field 364, and an FCS field 366. The GAS frame 350 may support similar features as the probe request frame 300 in FIG. 3A. That is, the reserved address may be included within any of the fields within the GAS frame 350. In an aspect, the GAS frame 350 may include an identifier, such as a category ID or value, identifying the requested feature, service, or vendor association. For example, the GAS frame 350 may include a category subfield 368, an action subfield 370, and/or an information element subfield 372. The category subfield 368 may indicate a general category in which the action frame belongs (e.g., spectrum management, service advertisement, public action frame, etc.), the action subfield 370 may indicate the specific action taken by the action frame, and the information element subfield 372 may include additional information related to the action to be taken. In an aspect, the category subfield 368 may include an identifier indicating the requested feature, service, or vendor association. In another aspect, the identifier may be in other subfields such as the action subfield 370 or the information element subfield 372. In another aspect, the action subfield 370 may indicate whether the frame is a GAS request frame or a GAS response frame. If the frame is a GAS request frame, then the information element subfield 372 may include additional requested information. For example, the identifier may indicate a request for 40 MHz bandwidth support, and the information element subfield 372 may include additional information related to whether specific 40 MHz channels are available for communication. If the frame is a GAS response frame, then the information element subfield 372 may include additional information. For example, the GAS response frame may indicate support for the 40 MHz bandwidth, and the information element subfield 372 may include 40 MHz channels available for communication. In another words, the information element subfield 372 may include one or more bits of additional information related to the service, feature, or vendor requested.

Figure 4:
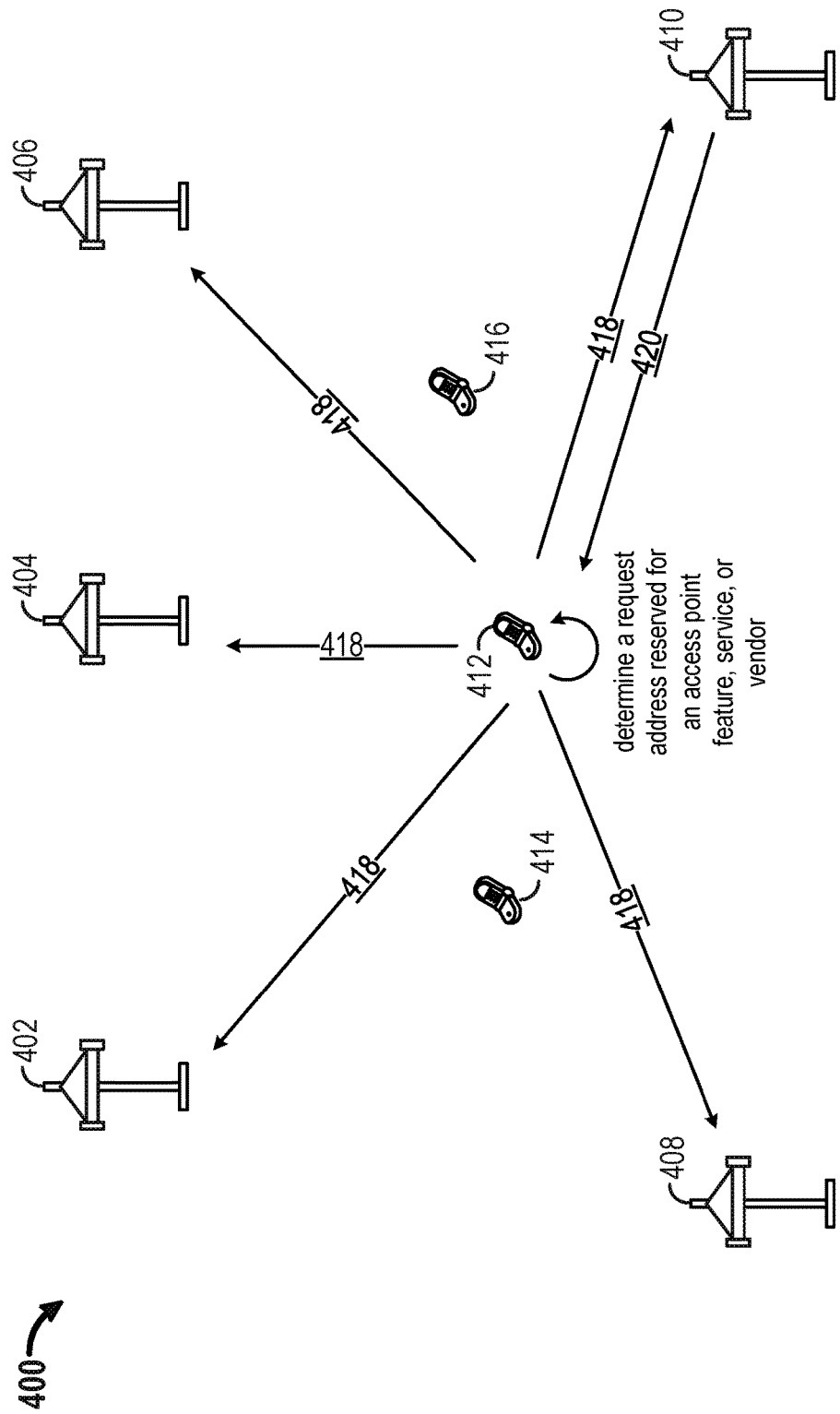
FIG. 4 is an exemplary diagram of a method for regulating responses in a wireless network.

FIG. 4 is an exemplary diagram 400 of a method for regulating responses in a wireless network. Referring to FIG. 4, a first AP 402, a second AP 404, a third AP 406, a fourth AP 408, and a fifth AP 410 are deployed within the wireless network. Other APs may also be deployed within the wireless network. STAs 412, 414, 416 (and/or other STAs) may also be within the wireless network. The STA 412, for example, may have a list or a database of addresses, and each address may be mapped one-to-one with a particular access point feature, service, vendor, or other information. That is, the address may identify the particular access point feature, service, vendor, or information to be requested. In an aspect, the list or the database of addresses may be predetermined, preconfigured, or received from the wireless network. Both the STA 412 and an AP may be preconfigured with the list or may receive the list from the wireless network. Based on an application selected by or a service requested by a user of the STA 412, the STA 412 may determine to discover an access point feature, service, or vendor associated with the application or request. The STA 412 may select from the list the address reserved for the access point feature, service, or vendor. The STA 412 may generate a request 418 (e.g., the probe request frame 300, the GAS frame 350, or any other frame) to discover an AP that may support a service or feature or to discover an AP that may be associated with a particular vendor (e.g., manufacturer or brand). The request 418 may be generated by determining the various fields in the request 418 (e.g., as indicated in FIG. 3) and by inserting the reserved address into at least one of the first address field or the third address field. Subsequently, the STA 412 may transmit the request 418 to nearby APs, such as the first, second, third, fourth, and fifth APs 402, 404, 406, 408, 410. In aspect, if the reserved address is transmitted only in the first address field of the request 418, then a first group bit in the first address field may be set to 1, and the third address field may retain the BSSID. In another aspect, if the reserved address is only transmitted in the third address field of the request 418, then the third address field may include a second group bit set to either 0 or 1. In another aspect, if the reserved address is transmitted in both the first and third address fields of the request 418, then the first group bit in the first address field may be set to 1, and the second group bit of the third address field may be set to 0.

Referring to FIG. 4, upon receiving the request 418, the first, second, and third APs 402, 404, 406 may be legacy APs (e.g., APs compliant with IEEE 802.11ac or other standards), and therefore, may not recognize the reserved address indicated in the request 418. As such, the first, second, and third APs 402, 404, 406 may not respond to the request 418. The fourth AP 408 may recognize the request 418 but may not have the feature, offer the service, or be associated with a vendor that is queried in the request 418. As such, the fourth AP 408 also may not respond to the request 418. By contrast, the fifth AP 410 may recognize the reserved address indicated in the request 418 and may determine that the fifth AP 410 provides a service (e.g., a gaming service) requested by the request 418. In one aspect, upon determining the fifth AP 410 offers the service, the fifth AP 410 may transmit a response 420 (e.g., a probe response, a GAS frame response, any other response frame). In another aspect, the request 418 may also include an identifier (e.g., when the request 418 is a GAS request frame) indicating a request for the service. In one instance, if the fifth AP 410 determines that the fifth AP 410 does not offer the service (or feature or information) requested by the identifier, then the fifth AP 410 may not respond to the request 418. In another instance, if the fifth AP 410 determines that the fifth AP 410 does not offer the service indicated by the identifier, the fifth AP 410 may transmit a null frame. By not transmitting the null frame, however, network congestion may be reduced. If the fifth AP 410 supports the service, then the response 420 may indicate that the fifth AP 410 offers the requested service. In an aspect, the response 420 may further indicate information related to the service (e.g., related gaming services available on the fifth AP 410). In another aspect, the response 420 may further indicate association information for the STA 412 to initiate association with the fifth AP 410. In another aspect, the response 420 may not only indicate that the fifth AP 410 has the feature or service, but also the response 420 may provide information related to the feature or service. For example, if the request 418 is a request for 40 MHz channel support, then the response 420 may not only indicate support for 40 MHz channels but may also indicate one or more 40 MHz channels on which the fifth AP 410 is available. In another aspect, the fifth AP 410 may transmit the response 420 via unicast and/or multicast/broadcast. If the fifth AP 410 transmits the response 420 via multicast or broadcast, then other STAs receiving the response 420 may become aware that the fifth AP 410 offers the gaming service along with any other services advertised in the response 420. Accordingly, the other STAs may not need to transmit a request for such services, which may reduce network congestion. In another aspect, the fifth AP 410 may choose transmit the response 420 via unicast or multicast/broadcast depending on whether the fifth AP 410 received multiple requests for the information. If the fifth AP 410 received only one request, then the fifth AP 410 may choose to transmit the response 420 via unicast. If the fifth AP 410 received multiple requests for the information, then the fifth AP 410 may consolidate multiple responses into the one response 420 and transmit the response 420 via multicast or broadcast.

As shown in FIG. 4, by utilizing a reserved address for device, feature, and/or service discovery, the amount of network traffic due to unwanted responses may be significantly reduced because APs that do not recognize the reserved address will not respond. Further, in the case of a GAS request frame, for example, an additional layer of filtering may be utilized by STAs for reducing network congestion. For example, a first layer of filtering may be the reserved address, in which only APs that recognize the address may respond while APs that do not recognize the address may not respond to the address. A second layer of filtering may be implemented by an identifier, in which an AP that recognizes the reserved address but does not offer the information requested as indicated by the identifier may not respond to the request (e.g., does not even respond with a null frame).

In densely deployed networks, multiple APs may receive the same request from the same STA. Networks may employ smart filtering to determine which AP should respond to the STA. In one configuration, each of the APs that receives the request from the STA may forward the respective request to a controller, and the controller may select the AP to respond to the STA (e.g., based on which AP received the request with the highest received signal strength indication (RSSI), has the most available bandwidth, or the highest transmission rate). The controller may send the request to the server. Upon receiving a response from the server, the controller may send the response to the selected AP for transmission to the STA. In another configuration, when the APs receive the request, the APs may coordinate to determine which AP will respond to the STA without using a third party entity (e.g., the controller). For example, the APs may exchange signaling to determine which APs received the request. Among those APs that received the request, the APs may select an AP to respond to the STA based on the RSSI associated with the request, an available bandwidth, and/or transmission rate. In this example, each of the APs may use the same algorithm to select the AP.

In another configuration, instead of (or in addition to) transmitting requests that include a reserved address, responses may be regulated by defining specific channels for discovery. In this configuration, APs may have a single, common channel or a set of channels that may be dedicated for discovering services, features, or capabilities. In the set of channels, each channel may be assigned to one or more access point features, services, and/or vendors (e.g., device or application vendors) that may be discoverable. A STA may transmit a request (e.g., a probe request or a GAS frame), which may include the well-known address (e.g., 0xFFFFFFFFFFFF) or the reserved address, to the common channel or to a channel in the set of channels, and an AP that supports the desired service or feature may respond by transmitting a response. In an aspect, an AP with OFDMA receivers may be able to receive on any channel, including channels on which the AP is not currently operating. In this aspect, a STA may be able to transmit a request on a channel different from a current channel of operation on the AP, and the AP may still receive the request (e.g., due to channel bonding) and transmit a response. By utilizing a known channel on which to discover a service, for example, a STA may not need to search every channel for the service. Instead, the STA may transmit on the known channel based on the service that the STA desires to discover, which may lead to power saving for the STA.

To illustrate an example of channel based response regulation, referring to FIG. 4, the wireless network may be deployed such that there is an assigned common 20 MHz channel in the 5 GHz band for a particular service. Other channel widths (e.g., 40 MHz) and communication bands (e.g., 2.4 GHz) may also be used. In this example, the first, second, and third APs 402, 404, 406 may be legacy APs and may not advertise available features, services, or vendor associations on a specific channel. However, the fourth and fifth APs 408, 410 may be compliant with future Wi-Fi standards and may select the 20 MHz channel on the 5 GHz band to advertise information related to the respective AP. For example, the fourth AP 408 may advertise on the 20 MHz channel that the fourth AP 408 has gaming services available. The fifth AP 410 may advertise on the same (or different) 20 MHz channel that the fifth AP 410 is compliant with the IEEE 802.11ai standard. The STA 412, for example, may determine that the STA 412 is interested in gaming services and/or is interested in discovering an IEEE 802.11ai-capable AP. The STA 412 may determine the discovery channel to monitor for discovery such services, and subsequently, may monitor the 20 MHz channel in the 5 GHz band to determine whether any of the interested services are available. The STA 412 may discover the fourth and fifth APs 408, 410 as a result. Legacy APs that do not advertise services on a particular channel (e.g., the first, second, and third APs 402, 404, 406) may not transmit on the particular discovery channel(s), thereby reducing the amount of wireless activity.

Figure 5:
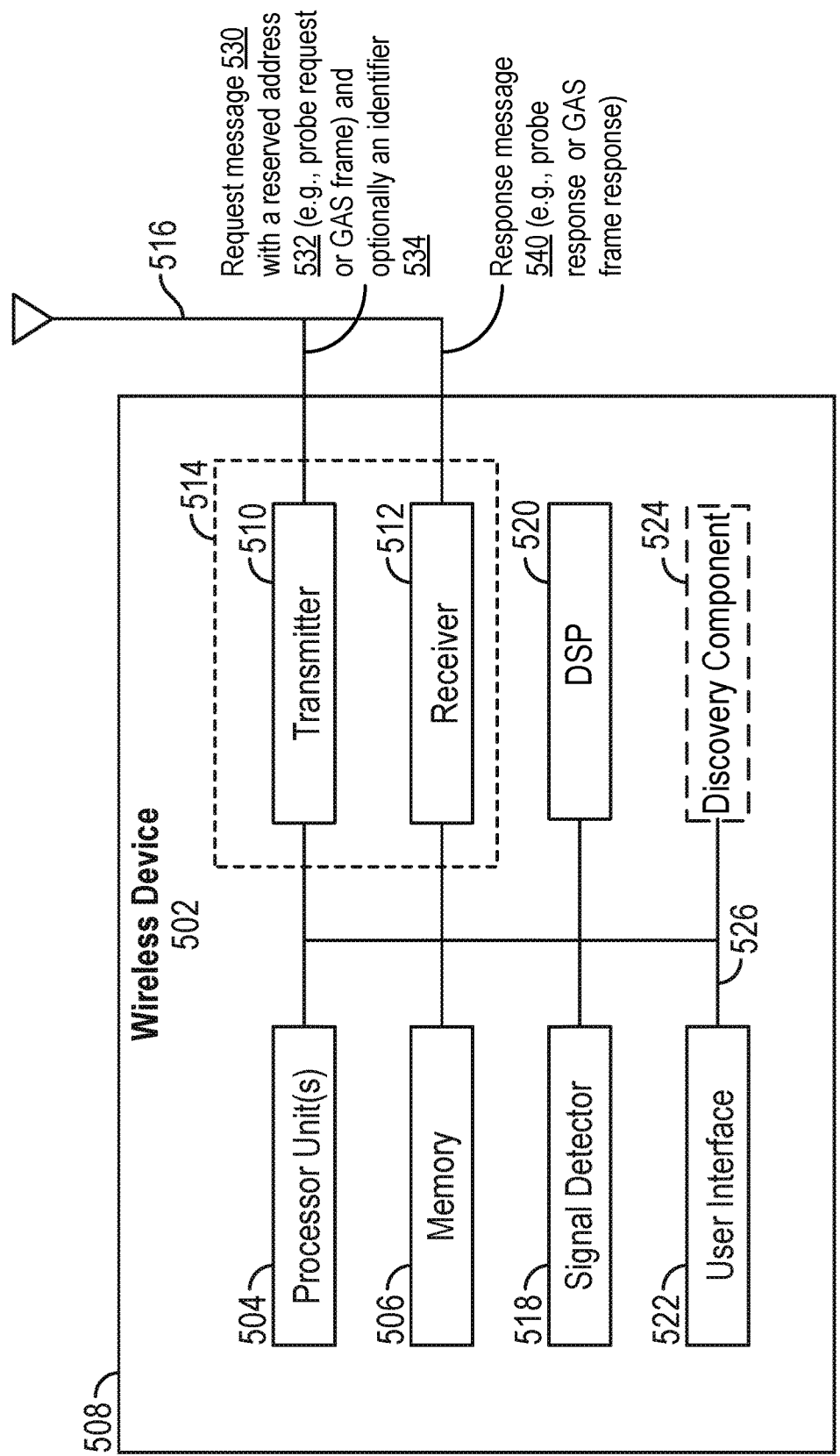
FIG. 5 shows an example functional block diagram of a wireless device that may be employed within the wireless communication system of FIG. 1 for regulating responses.

FIG. 5 shows an example functional block diagram of a wireless device 502 that may be employed within the wireless communication system 100 of FIG. 1 for regulating responses. The wireless device 502 is an example of a device that may be configured to implement the various methods described herein. For example, the wireless device 502 may comprise the AP 104 or one of the STAs 112, 114, 116, 118, 412.

The wireless device 502 may include a processor 504 which controls operation of the wireless device 502. The processor 504 may also be referred to as a central processing unit (CPU). Memory 506, which may include both read-only memory (ROM) and random access memory (RAM), may provide instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable (by the processor 504, for example) to implement the methods described herein.

The processor 504 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 502 may also include a housing 508, and the wireless device 502 may include a transmitter 510 and/or a receiver 512 to allow transmission and reception of data between the wireless device 502 and a remote device. The transmitter 510 and the receiver 512 may be combined into a transceiver 514. An antenna 516 may be attached to the housing 508 and electrically coupled to the transceiver 514. The wireless device 502 may also include multiple transmitters, multiple receivers, multiple transceivers, and/or multiple antennas.

The wireless device 502 may also include a signal detector 518 that may be used to detect and quantify the level of signals received by the transceiver 514 or the receiver 512. The signal detector 518 may detect such signals as total energy, energy per subcarrier per symbol, power spectral density, and other signals. The wireless device 502 may also include a DSP 520 for use in processing signals. The DSP 520 may be configured to generate a packet for transmission. In some aspects, the packet may comprise a physical layer convergence protocol (PLCP) protocol data unit (PPDU).

The wireless device 502 may further comprise a user interface 522 in some aspects. The user interface 522 may comprise a keypad, a microphone, a speaker, and/or a display. The user interface 522 may include any element or component that conveys information to a user of the wireless device 502 and/or receives input from the user.

When the wireless device 502 is implemented as a STA (e.g., STA 114 or STAs 412, 414, 416), the wireless device 502 may also comprise a discovery component 524. In one configuration, the discovery component 524 may be configured to transmit a request message 530 to a plurality of access points. The request message 530 may include an address 532 reserved for at least one of an access point feature, an access point service, or an access point vendor. The discovery component 524 may be configured to receive a response message 540 from at least one access point of the plurality of access points. The response message 540 may indicate that the at least one access point has the access point feature, is associated with the access point service, or is associated with the access point vendor. In an aspect, the request may include a receiver address field, a transmitter address field, and a network address field, and the address 532 may be located in at least one of the receiver address field or the network address field. In another aspect, the address 532 may be located in the receiver address field, and the receiver address field may further include a group bit set to 1. In another aspect, the address 532 may be located in the network address field, and the network address field may include a group bit set to 0. In another aspect, the address 532 may be located in the receiver address field and the network address field, the receiver address field may have a first group bit set to 1, and the network address field may have a second group bit set to 0. In another aspect, the address 532 in the request message 530 may indicate a query for a specific service or a set of services provided by an access point. In another aspect, the address 532 in the request message 530 may indicate a query for a group of devices identified by the address 532. In another aspect, the request message 530 may further include a query of one or more capabilities associated with the access point feature or the access point vendor indicated by the address 532. In another aspect, the address 532 may be different from a second address in which bits of the second address are all set to 1. In yet another aspect, the discovery component 524 may be configured to determine the address 532 for transmitting the request message 530. In this aspect, the discovery component 524 may be configured to determine the address 532 by determining the access point feature, the access point service, or the access point vendor to query and by selecting the address 532 reserved for the access point feature, the access point service, or the access point vendor. In another aspect, the address 532 may be included in a WLAN standard or may be vendor specific. In another aspect, the request message 530 may be a probe request and the response may be a probe response. In another aspect, the request message 530 may include an identifier 534 indicating that the request is a GAS request frame requesting the at least one of the access point feature, the access point service, or the access point vendor.

In another configuration, the discovery component 524 may be configured to determine to discover whether a service is available on a network and to monitor a channel associated with the service to determine whether the service is available on the network. In an aspect, the service may include an access point service, an access point feature, or an access point vendor. In another aspect, the discovery component 524 may be configured to determine to discover by determining the service to be discovered on the network and by selecting the channel associated with the service from a set of channels. In this aspect, information indicating the availability of the service may be reserved for transmission on the channel when the service is available on the network. In another aspect, the set of channels may include one or more 20 MHz channels in a 5 GHz band, and each 20 MHz channel may be associated with a different service. In another aspect, the discovery component 524 may be configured to monitoring the channel by receiving transmissions on the channel and by determining whether the received transmission indicates that the service is available on an access point within the network.

The various components of the wireless device 502 may be coupled together by a bus system 526. The bus system 526 may include a data bus, for example, as well as a power bus, a control signal bus, and a status signal bus in addition to the data bus. Components of the wireless device 502 may be coupled together or accept or provide inputs to each other using some other mechanism.

Although a number of separate components are illustrated in FIG. 5, one or more of the components may be combined or commonly implemented. For example, the processor 504 may be used to implement not only the functionality described above with respect to the processor 504, but also to implement the functionality described above with respect to the signal detector 518, the DSP 520, the user interface 522, and/or the discovery component 524. Further, each of the components illustrated in FIG. 5 may be implemented using a plurality of separate elements.

Figure 6:
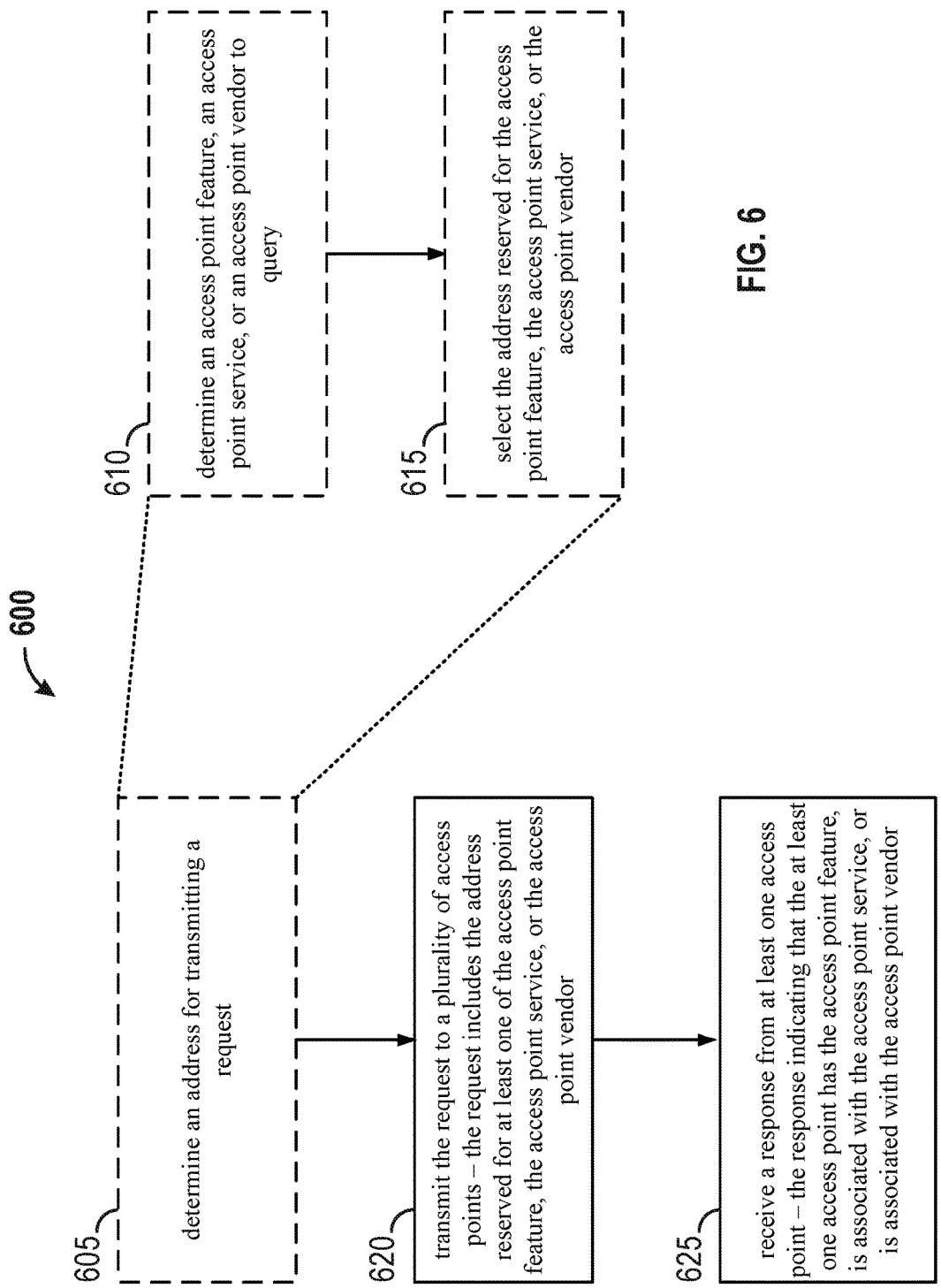
FIG. 6 is a flowchart of an example method of wireless communication for regulating responses using reserved addresses.

FIG. 6 is a flowchart of an example method 600 of wireless communication for regulating responses using reserved addresses. The method 600 may be performed using an apparatus (e.g., the STA 114, the STA 412, or the wireless device 502, for example). Although the method 600 is described below with respect to the elements of wireless device 502 of FIG. 5, other components may be used to implement one or more of the steps described herein. The dotted lines with respect to the various blocks represent optional blocks.

At block 605, the apparatus may determine an address for transmitting a request. The apparatus may determine the address by determining the access point feature, the access point service, or the access point vendor to query (at block 610) and by selecting the address reserved for the access point feature, the access point service, or the access point vendor (at block 615). In an aspect, the address may be different from 0xFFFFFFFFFFFF, to which all APs may respond if a request is addressed to such an address. For example, referring to FIG. 4, the apparatus may be the STA 412. The STA 412 may determine the address for transmitting the request 418 by determining to discover whether a gaming service is being offered by any nearby APs, and by determining the address reserved for the gaming service.

At block 620, the apparatus may transmit the request to a plurality of access points. The request may include the address reserved for at least one of the access point feature, the access point service, or the access point vendor. In an aspect, the request may include a receiver address field (e.g., address field 1 in FIG. 3), a transmitter address field (e.g., address field 2 in FIG. 3), and a network address field (e.g., address field 3 in FIG. 3). The address is located in at least one of the receiver address field or the network address field. In another aspect, the address may be located in the receiver address field, and the receiver address field may include a group bit set to 1. In another aspect, the address may be located in the network address field, and the network address field may include a group bit set to 0. In another aspect, the address is located in the receiver address field and the network address field, the receiver address field may have a first group bit set to 1, and the network address field may have a second group bit set to 0. In another aspect, the address in the request may indicate a query for a specific service (e.g., a specific type of game or application service) or a set of services provided by an access point (e.g., gaming services in general). In another aspect, the address in the request may indicate a query for a group of devices identified by the address (e.g., a NAN cluster/NAN device group). In another aspect, the request may include a query of one or more capabilities associated with the access point feature (e.g., support for 160 MHz channel bandwidth and IEEE 802.11ai features) or the access point vendor indicated by the address. For example, referring to FIG. 4, the STA 412 may transmit the request 418 to a number of nearby APs, such as the first, second, third, fourth, and fifth APs 402, 404, 406, 408, 410. The request 418 may include in the network address field an address reserved for a gaming service, and the frame body field of the request 418 may further indicate one or two specific types of gaming services related to board games.

At 625, the apparatus may receive a response from at least one access point. The response may indicate that the at least one access point has the access point feature, is associated with the access point service, or is associated with the access point vendor. For example, referring to FIG. 4, the STA 412 may receive the response 420 from the fifth AP 410, and the response 420 may indicate that the fifth AP 410 offers gaming services, and specifically, one of the gaming services indicated in the frame body field of the request 418.

Figure 7:
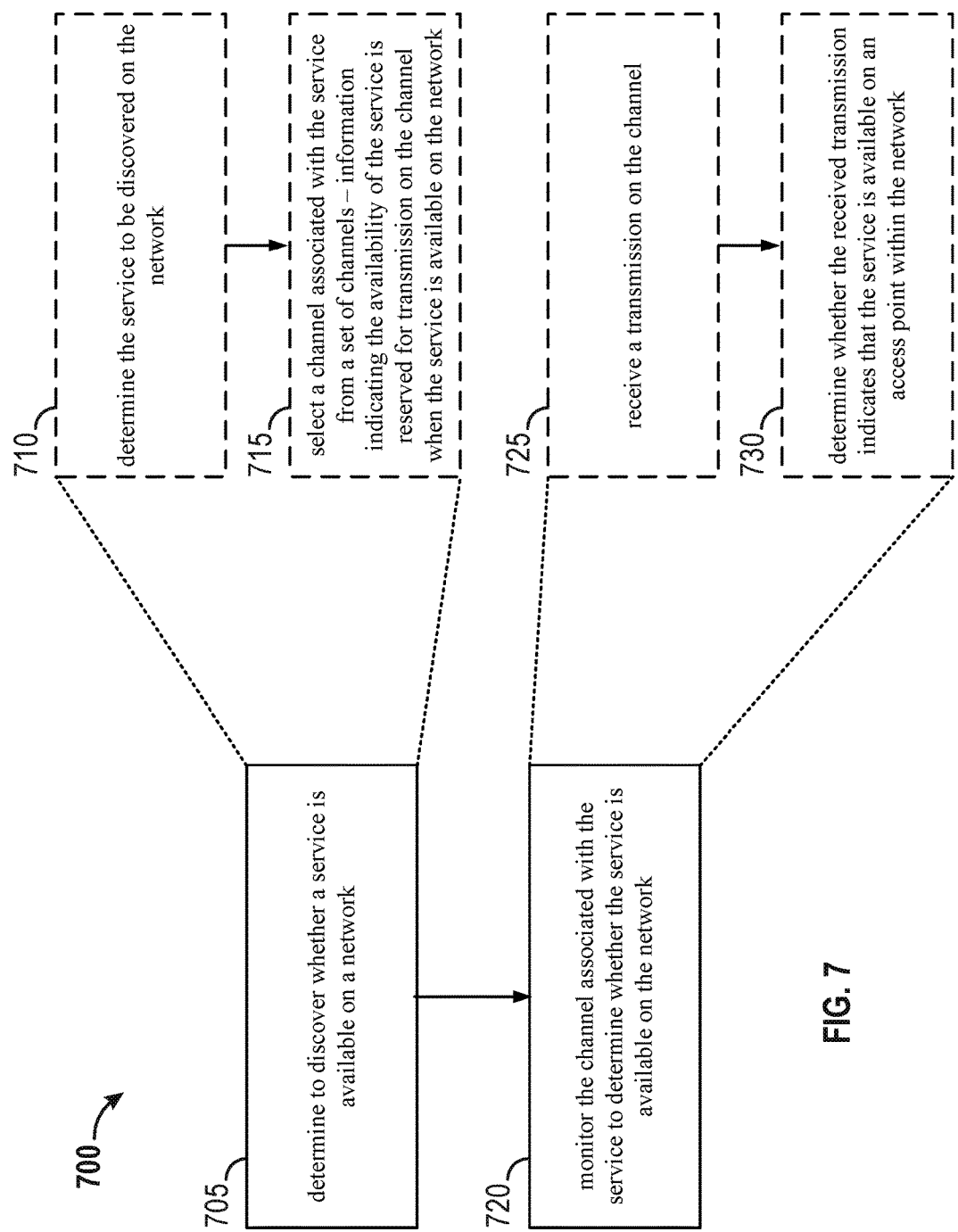
FIG. 7 is a flowchart of an example method of wireless communication for regulating responses using discovery channels.

FIG. 7 is a flowchart of an example method 700 of wireless communication for regulating responses using discovery channels. The method 700 may be performed using an apparatus (e.g., the STA 114, the STA 412, or the wireless device 502, for example). Although the method 700 is described below with respect to the elements of wireless device 502 of FIG. 5, other components may be used to implement one or more of the steps described herein. The dotted lines with respect to the various blocks represent optional blocks.

At block 705, the apparatus may determine to discover whether a service is available on a network. The apparatus may determine to discover whether the service is available by determining the service to be discovered on the network (at block 710) and by selecting the channel associated with the service from a set of channels (at block 715). In an aspect, information indicating the availability of the service is reserved for transmission on the channel when the service is available on the network. In another aspect, the service may include an access point service (e.g., a gaming service), an access point feature (e.g., support for multiple streams), or an access point vendor (e.g., compatible with specifications associated with a particular access point vendor). For example, referring to FIG. 4, the apparatus may be the STA 412. The STA 412 may determine to discover whether any nearby APs are compatible with IEEE 802.11ai. The STA 412 may select a 20 MHz channel in the 5 GHz band preconfigured for providing discovery information related to IEEE 802.11ai compatible devices. In an aspect, the STA 412 may have a list indicating a set of channels (e.g., 20 MHz channels in the 5 GHz band), and each channel in the 5 GHz channel may be associated with a discoverable service in a wireless network. That is, each service may be reserved for discovery on one channel and not any other channel.

At block 720, the apparatus may monitor the channel associated with the service to determine whether the service is available on the network. The apparatus may monitor the channel by receiving a transmission from the channel (at 725) and by determining whether the received transmission indicates that the service is available on an access point within the network (at 730). For example, referring to FIG. 4, the STA 412 may monitor the 20 MHz channel associated with IEEE 802.11ai service discovery by receiving a transmission on the 20 MHz channel and determining if the transmission includes discovery information that indicates that the AP (e.g., the fifth AP 410), which transmitted the discovery information, supports IEEE 802.11ai.

Figure 8:
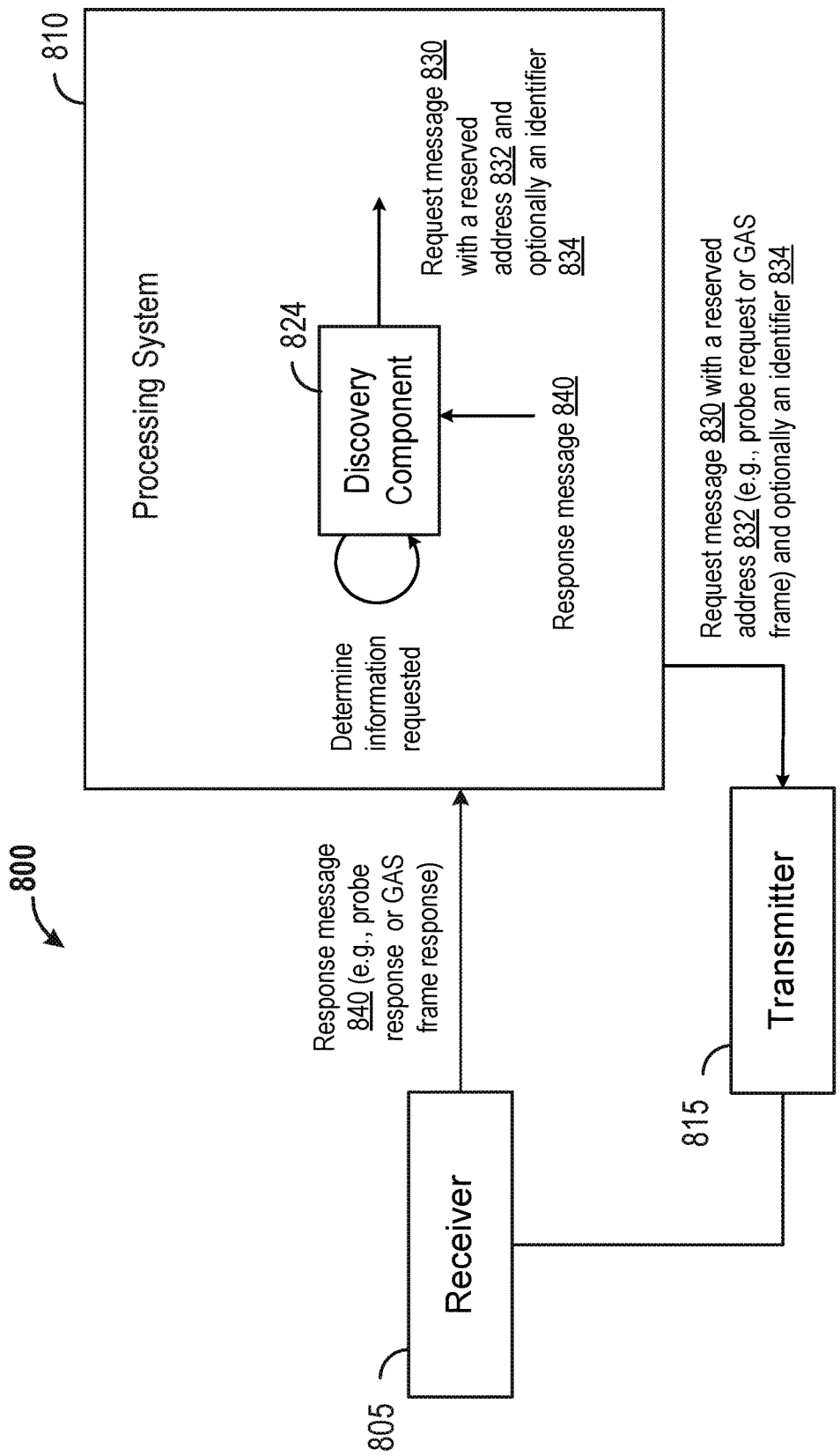
FIG. 8 is a functional block diagram of an example wireless communication device configured for regulating responses.

FIG. 8 is a functional block diagram of an example wireless communication device 800 configured for regulating responses. The wireless communication device 800 may include a receiver 805, a processing system 810, and a transmitter 815. The processing system 810 may include a discovery component 824. In one configuration, the processing system 810, the discovery component 824, and/or the transmitter 815 may be configured to transmit a request message 830 to a plurality of access points. The request message 830 may include an address 832 reserved for at least one of an access point feature, an access point service, or an access point vendor. In this configuration, the processing system 810, the discovery component 824, and/or the receiver 805 may be configured to receive a response message 840 from at least one access point of the plurality of access points. The response message 840 may indicate that the at least one access point has the access point feature, is associated with the access point service, or is associated with the access point vendor. In an aspect, the request message 830 may include a receiver address field, a transmitter address field, and a network address field, and the address may be located in at least one of the receiver address field or the network address field. In another aspect, the address 832 may be located in the receiver address field, and the receiver address field may further include a group bit set to 1. In another aspect, the address 832 may be located in the network address field, and the network address field may include a group bit set to 0. In another aspect, the address 832 may be located in the receiver address field and the network address field, the receiver address field may have a first group bit set to 1, and the network address field may have a second group bit set to 0. In another aspect, the address 832 in the request message 830 may indicate a query for a specific service or a set of services provided by an access point. In another aspect, the address 832 in the request message 830 may indicate a query for a group of devices identified by the address 832. In another aspect, the request message 830 may further include a query of one or more capabilities associated with the access point feature or the access point vendor indicated by the address 832. In another aspect, the address 832 may be different from a second address in which bits of the second address are all set to 1. In yet another aspect, the processing system 810 and/or the discovery component 824 may be configured to determine the address for transmitting the request. In this aspect, the processing system 810 and/or the discovery component 824 may be configured to determine the address by determining the access point feature, the access point service, or the access point vendor to query and by selecting the address reserved for the access point feature, the access point service, or the access point vendor. In another aspect, the address 832 may be included in a WLAN standard or may be vendor specific. In another aspect, the request message 830 may be a probe request and the response message 840 may be a probe response. In another aspect, the request message 830 may include an identifier 834 indicating that the request message 830 is a GAS request frame requesting the at least one of the access point feature, the access point service, or the access point vendor.

In another configuration, the processing system 810 and/or the discovery component 824 may be configured to determine to discover whether a service is available on a network. In this configuration, the processing system 810, the discovery component 824, and/or the receiver 805 may be configured to monitor a channel associated with the service to determine whether the service is available on the network. In an aspect, the service may include an access point service, an access point feature, or an access point vendor. In another aspect, the processing system 810 and/or the discovery component 824 may be configured to determine to discover by determining the service to be discovered on the network and by selecting the channel associated with the service from a set of channels. In this aspect, information indicating the availability of the service may be reserved for transmission on the channel when the service is available on the network. In another aspect, the set of channels may include one or more 20 MHz channels in a 5 GHz band, and each 20 MHz channel may be associated with a different service. In another aspect, the processing system 810, the discovery component 824, and/or the receiver 805 may be configured to monitor the channel by receiving transmissions on the channel and by determining whether the received transmission indicates that the service is available on an access point within the network.

The receiver 805, the processing system 810, the discovery component 824, and/or the transmitter 815 may be configured to perform one or more functions discussed above with respect to blocks 605, 610, 615, 620, and 625 of FIG. 6 and to blocks 705, 710, 715, 720, 725, and 730 of FIG. 7. The receiver 805 may correspond to the receiver 512. The processing system 810 may correspond to the processor 504. The transmitter 815 may correspond to the transmitter 510. The discovery component 824 may correspond to the discovery component 126, and/or the discovery component 524.

In one configuration, the wireless communication device 800 includes means for transmitting a request message to a plurality of access points. The request message may include an address reserved for at least one of an access point feature, an access point service, or an access point vendor. The wireless communication device 800 may include means for receiving a response message from at least one access point of the plurality of access points. The response message may indicate that the at least one access point has the access point feature, is associated with the access point service, or is associated with the access point vendor. In an aspect, the request message may include a receiver address field, a transmitter address field, and a network address field, and the address may be located in at least one of the receiver address field or the network address field. In another aspect, the address may be located in the receiver address field, and the receiver address field may further include a group bit set to 1. In another aspect, the address may be located in the network address field, and the network address field may include a group bit set to 0. In another aspect, the address may be located in the receiver address field and the network address field, the receiver address field may have a first group bit set to 1, and the network address field may have a second group bit set to 0. In another aspect, the address in the request message may indicate a query for a specific service or a set of services provided by an access point. In another aspect, the address in the request message may indicate a query for a group of devices identified by the address. In another aspect, the request message may further include a query of one or more capabilities associated with the access point feature or the access point vendor indicated by the address. In another aspect, the address may be different from a second address in which bits of the second address are all set to 1. In yet another aspect, the wireless communication device 800 may include means for determining the address for transmitting the request message. In this aspect, the means for determining the address may be configured to determine the address by determining the access point feature, the access point service, or the access point vendor to query and by selecting the address reserved for the access point feature, the access point service, or the access point vendor. In another aspect, the address may be included in a WLAN standard or may be vendor specific. In another aspect, the request may be a probe request and the response may be a probe response. In another aspect, the request may include an identifier indicating that the request is a GAS request frame requesting the at least one of the access point feature, the access point service, or the access point vendor.

In another configuration, the wireless communication device 800 may include means for determining to discover whether a service is available on a network and means for monitoring a channel associated with the service to determine whether the service is available on the network. In an aspect, the service may include an access point service, an access point feature, or an access point vendor. In another aspect, the means for determining to discover may be configured to determine the service to be discovered on the network and to select the channel associated with the service from a set of channels. In this aspect, information indicating the availability of the service may be reserved for transmission on the channel when the service is available on the network. In another aspect, the set of channels may include one or more 20 MHz channels in a 5 GHz band, and each 20 MHz channel may be associated with a different service. In another aspect, the means for monitoring the channel may be configured to receive transmissions on the channel and to determine whether the received transmission indicates that the service is available on an access point within the network.

The aforementioned means may be one or more of the aforementioned components of the wireless communication device 800 and/or the processing system 810 of the wireless communication device 800 configured to perform the functions recited by the aforementioned means. For example, means for transmitting may include the processing system 810, the discovery component 824, and/or the transmitter 815. Means for receiving may include the processing system 810, the discovery component 824, and/or the receiver 805. Means for determining the address may include the processing system 810 and/or the discovery component 824. Means for determining to discover whether a service is available may include the processing system 810 and/or the discovery component 824. Means for monitoring the channel may include the processing system 810, the discovery component 824, and/or the receiver 805.

Figure 9:
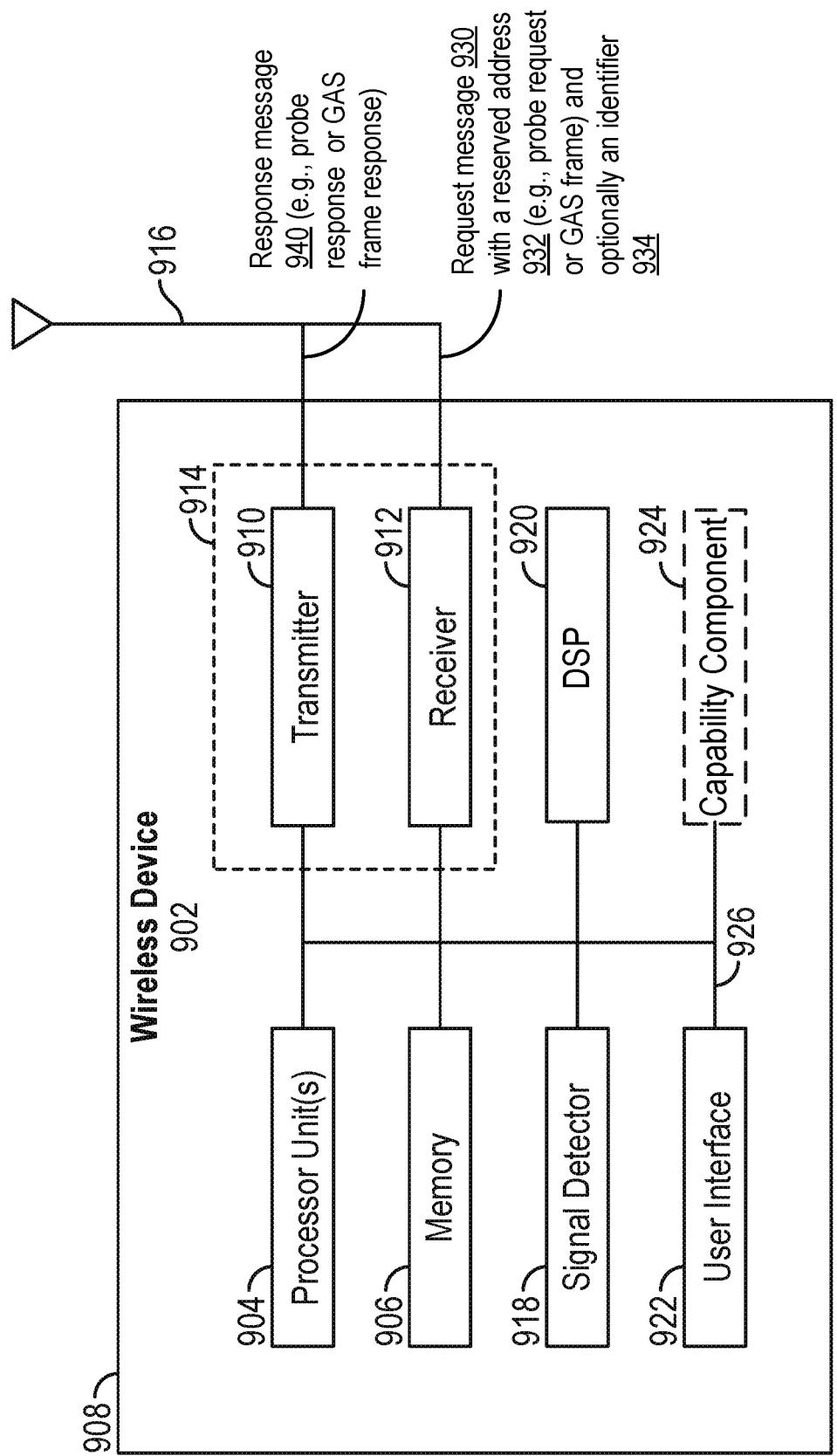
FIG. 9 shows an example functional block diagram of a wireless device that may be employed within the wireless communication system of FIG. 1 for providing capability responses.

FIG. 9 shows an example functional block diagram of a wireless device 902 that may be employed within the wireless communication system 100 of FIG. 1 for providing capability responses. The wireless device 902 is an example of a device that may be configured to implement the various methods described herein. For example, the wireless device 902 may comprise the AP 104 or one of the STAs 112, 114, 116, 118, 412.

The wireless device 902 may include a processor 904 which controls operation of the wireless device 902. The processor 904 may also be referred to as a CPU. Memory 906, which may include both ROM and RAM, may provide instructions and data to the processor 904. A portion of the memory 906 may also include NVRAM. The processor 904 typically performs logical and arithmetic operations based on program instructions stored within the memory 906. The instructions in the memory 906 may be executable (by the processor 904, for example) to implement the methods described herein.

The processor 904 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 902 may also include a housing 908, and the wireless device 902 may include a transmitter 910 and/or a receiver 912 to allow transmission and reception of data between the wireless device 902 and a remote device. The transmitter 910 and the receiver 912 may be combined into a transceiver 914. An antenna 916 may be attached to the housing 908 and electrically coupled to the transceiver 914. The wireless device 902 may also include multiple transmitters, multiple receivers, multiple transceivers, and/or multiple antennas.

The wireless device 902 may also include a signal detector 918 that may be used to detect and quantify the level of signals received by the transceiver 914 or the receiver 912. The signal detector 918 may detect such signals as total energy, energy per subcarrier per symbol, power spectral density, and other signals. The wireless device 902 may also include a DSP 920 for use in processing signals. The DSP

920 may be configured to generate a packet for transmission. In some aspects, the packet may comprise a PPDU.

The wireless device 902 may further comprise a user interface 922 in some aspects. The user interface 922 may comprise a keypad, a microphone, a speaker, and/or a display. The user interface 922 may include any element or component that conveys information to a user of the wireless device 902 and/or receives input from the user.

When the wireless device 902 is implemented as an AP (e.g., the AP 104 or the fifth AP 410), the wireless device 902 may also comprise a capability component 924. In one configuration, the capability component 924 may be configured to receive a request message 930 (e.g., a probe request or a GAS request frame) that includes an address 932 reserved for discovering access points associated with at least one of an access point feature, an access point service, or an access point vendor. The capability component 924 may be configured to determine whether the wireless device 902 is associated with the access point feature, the access point service, or the access point vendor that is identified by the address. The capability component 924 may be configured to make the determination by determining the access point feature, the access point service, or the access point vendor identified by the address 932 and by comparing the access point service, the access point feature, or the access point vendor with a list of attributes associated with the wireless device 902. In another configuration, the request message 930 may include an identifier 934 indicating the information requested. In another configuration, the capability component 924 may be configured to transmit, based on the determination, a response message 940 (e.g., a probe response or a GAS frame response) indicating that the wireless device 902 has the access point feature, supports the access point service, or is associated with the access point vendor.

In another configuration, the capability component 924 may be configured to receive a request for discovering a service on a channel dedicated for discovering access point services. The capability component 924 may be configured to transmit a response on the channel dedicated for discovering access point services. The response may indicate that the wireless device 902 is associated with, supports, provides the service. In an aspect, the response may be transmitted based on the received request in the dedicated channel associated with the service.

The various components of the wireless device 902 may be coupled together by a bus system 926. The bus system 926 may include a data bus, for example, as well as a power bus, a control signal bus, and a status signal bus in addition to the data bus. Components of the wireless device 902 may be coupled together or accept or provide inputs to each other using some other mechanism.

Although a number of separate components are illustrated in FIG. 9, one or more of the components may be combined or commonly implemented. For example, the processor 904 may be used to implement not only the functionality described above with respect to the processor 904, but also to implement the functionality described above with respect to the signal detector 918, the DSP 920, the user interface 922, and/or the capability component 924. Further, each of the components illustrated in FIG. 9 may be implemented using a plurality of separate elements.

Figure 10:
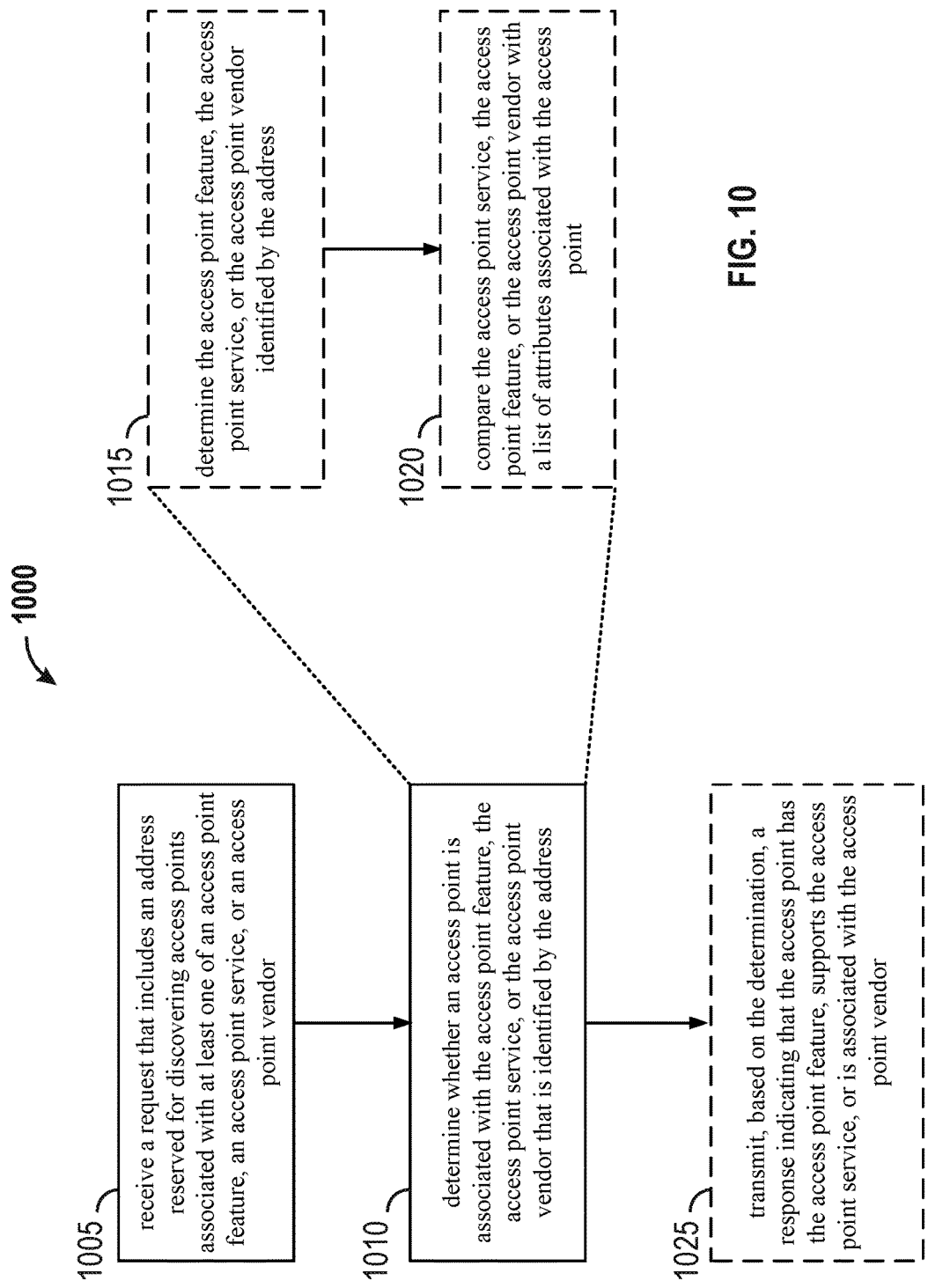
FIG. 10 is a flowchart of an example method of using reserved addresses for providing capability information.

FIG. 10 is a flowchart of an example method 1000 of using reserved addresses for providing capability information. The method 1000 may be performed using an apparatus (e.g., the AP 104, the fifth AP 410, or the wireless device 502, for example). Although the method 1000 is described below with respect to the elements of wireless device 902 of FIG. 9, other components may be used to implement one or more of the steps described herein. The dotted lines with respect to the various blocks represent optional blocks.

At block 1005, the apparatus may receive a request that includes an address reserved for discovering access points associated with at least one of an access point feature, an access point service, or an access point vendor. For example, referring to FIG. 4, the apparatus may be the fifth AP 410. The fifth AP 410 may receive the request 418 that includes an address reserved for access point that support IEEE 802.11ai services.

At block 1010, the apparatus may determine whether the apparatus is associated with the access point feature, the access point service, or the access point vendor that is identified by the address. The apparatus may make such a determination by determining the access point feature, the access point service, or the access point vendor identified by the address (at block 1015) and by comparing the access point service, the access point feature, or the access point vendor with a list of attributes associated with the apparatus (at block 1020). For example, referring to FIG. 4, the fifth AP 410 may determine that the fifth AP 410 is supports IEEE 802.11ai services by determining that the address in the request 418 identifies a request for IEEE 802.11ai services and by comparing the list of services supported by the fifth AP 410 and determining that IEEE 802.11ai services are among the services/attributes supported by the fifth AP 410.

At block 1025, the apparatus may transmit, based on the determination, a response indicating that the apparatus has the access point feature, supports the access point service, or is associated with the access point vendor. For example, referring to FIG. 4, the fifth AP may transmit, based on the determination that the fifth AP 410 supports IEEE 802.11ai services, the response 420.

Figure 11:
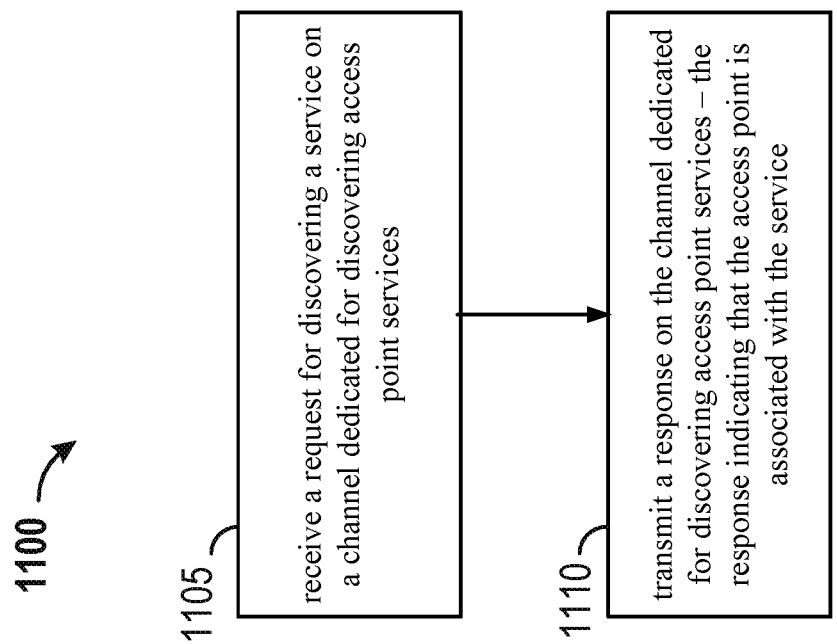
FIG. 11 is a flowchart of an example method of using dedicated discovery channels for device discovery.

FIG. 11 is a flowchart of an example method 1100 of using dedicated discovery channels for device discovery. The method 1100 may be performed using an apparatus (e.g., the AP 104, the fifth AP 410, or the wireless device 502, for example). Although the method 1100 is described below with respect to the elements of wireless device 902 of FIG. 9, other components may be used to implement one or more of the steps described herein. The dotted lines with respect to the various blocks represent optional blocks.

At block 1105, the apparatus may receive a request for discovering a service on a channel dedicated for discovery access point services. For example, referring to FIG. 4, the fifth AP 410 may receive the request 418 for discovering a gaming service on a 20 MHz channel that is dedicated for discovering gaming services. The fifth AP 410 may be operating on a 20 MHz channel different from the channel on which the request 418 was received.

At block 1110, the apparatus may transmit a response on the channel dedicated for discovering access point services, and the response may indicate that the apparatus is associated with the service. For example, referring to FIG. 4, the fifth AP 410 may transmit the response 420 on the 20 MHz channel dedicated for discovering the gaming service, and the response 420 may indicate that the fifth AP 410 provides the gaming service.

Figure 12:
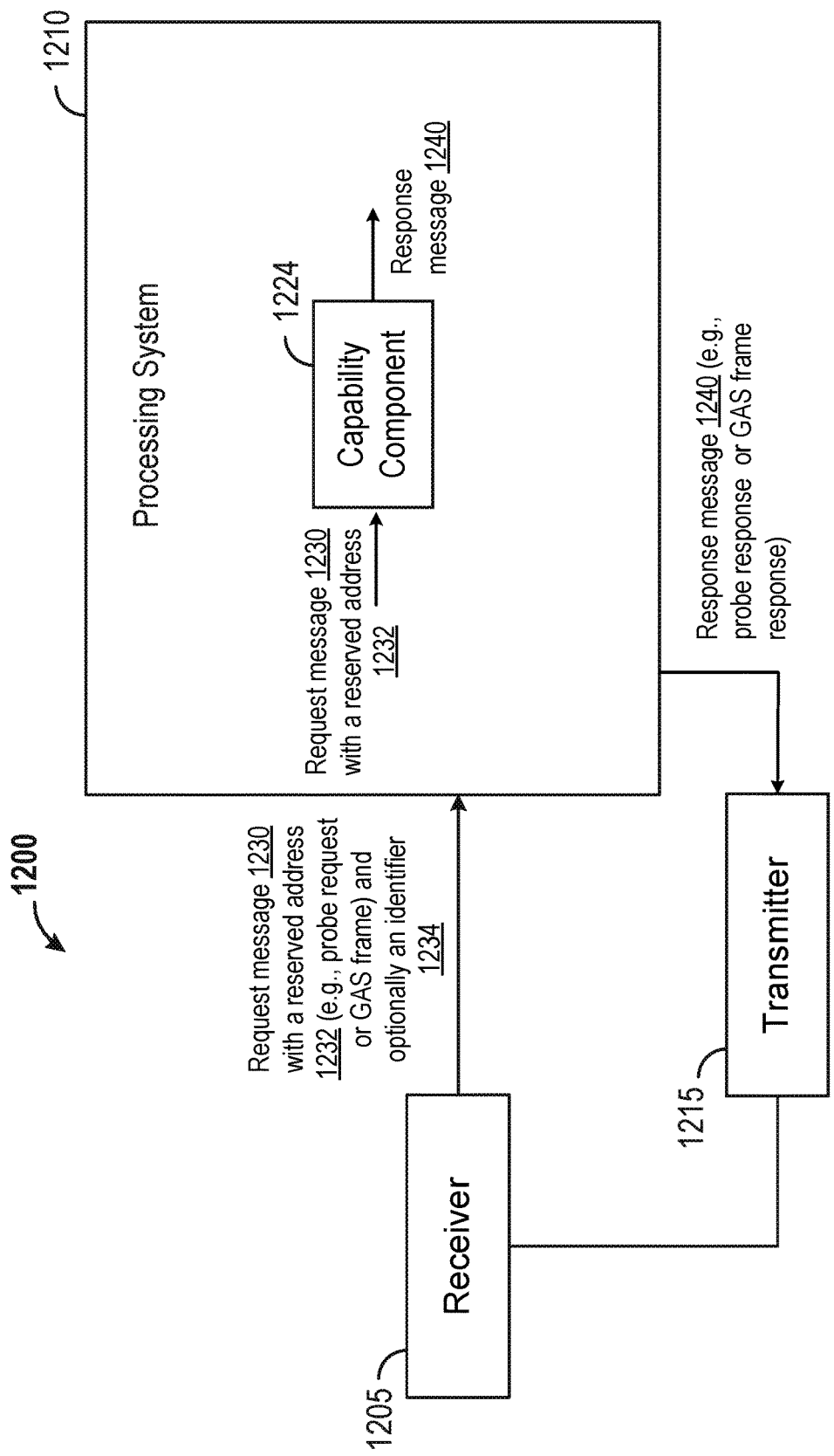
FIG. 12 is a functional block diagram of an example wireless communication device configured for providing capability responses.

FIG. 12 is a functional block diagram of an example wireless communication device 1200 configured for providing capability responses. The wireless communication device 1200 may include a receiver 1205, a processing system 1210, and a transmitter 1215. The processing system 1210 may include a capability component 1224. In one configuration, the processing system 1210, the capability component 1224, and/or the receiver 1205 may be configured to receive a request message 1230 that includes an address 1232 reserved for discovering access points associated with the at least one of an access point feature, an access point service, or an access point vendor. The processing system 1210 and/or the capability component 1224 may be configured to determine whether the wireless communication device 1200 is associated with the access point feature, the access point service, or the access point vendor that is identified by the address. In an aspect, the processing system 1210 and/or the capability component 1224 may be configured to make the determination by determining the access point feature, the access point service, or the access point vendor identified by the address and by comparing the access point service, the access point feature, or the access point vendor with a list of attributes associated with the wireless communication device 1200. In an aspect, the request message 1230 may include an identifier 1234. In another configuration, the processing system 1210, the capability component 1224, and/or the transmitter 1215 may be configured to transmit, based on the determination, a response message 1240 indicating that the wireless communication device 1200 has the access point feature, supports the access point service, or is associated with the access point vendor.

In another configuration, the processing system 1210, the capability component 1224, and/or the receiver 1205 may be configured to receive a request for discovering a service on a channel dedicated for discovery access point services. The processing system 1210, the capability component 1224, and/or the transmitter 1215 may be configured to transmit a response on the channel dedicated for discovering access point service. The response may indicate that the wireless communication device 1200 is associated with or provides the service.

The receiver 1205, the processing system 1210, the capability component 1224, and/or the transmitter 1215 may be configured to perform one or more functions discussed above with respect to blocks 1005, 1010, 1015, 1020, and 1025 of FIG. 10 and to blocks 1105 and 1110 of FIG. 11. The receiver 1205 may correspond to the receiver 912. The processing system 1210 may correspond to the processor 904. The transmitter 1215 may correspond to the transmitter 910. The capability component 1224 may correspond to the capability component 124, and/or the capability component 924.

In one configuration, the wireless communication device 1200 includes means for receiving a request message that includes an address reserved for discovering access points associated with the at least one of an access point feature, an access point service, or an access point vendor. The wireless communication device 1200 includes means for determining whether the wireless communication device 1200 is associated with the access point feature, the access point service, or the access point vendor that is identified by the address. In an aspect, the means for determining may be configured to make the determination by determining the access point feature, the access point service, or the access point vendor identified by the address and by comparing the access point service, the access point feature, or the access point vendor with a list of attributes associated with the wireless communication device 1200. In another aspect, the wireless communication device 1200 may include means for transmitting, based on the determination, a response message indicating that the wireless communication device 1200 has the access point feature, supports the access point service, or is associated with the access point vendor.

In another configuration, the wireless communication device 1200 may include means for receiving a request for discovering a service on a channel dedicated for discovery access point services. The wireless communication device 1200 includes means for transmitting a response on the channel dedicated for discovering access point service. The response may indicate that the wireless communication device 1200 is associated with or provides the service.

The aforementioned means may be one or more of the aforementioned components of the wireless communication device 1200 and/or the processing system 1210 of the wireless communication device 1200 configured to perform the functions recited by the aforementioned means. For example, means for receiving a request message may include the processing system 1210, the capability component 1224, and/or the receiver 1205. Means for determining whether the access point is associated with the access point feature, the access point service, or the access point vendor may include the processing system 1210 and/or the capability component 1224. Means for transmitting may include the processing system 1210, the capability component 1224, and/or the transmitter 1215. Means for receiving a request for discovering a service on a channel may include the processing system 1210, the capability component 1224, and/or the receiver 1205. Means for transmitting a response on the channel may include the processing system 1210, the capability component 1224, and/or the transmitter 1215.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a station, comprising:
   transmitting a request message to a plurality of access points, the request message being transmitted to and comprising an address reserved for at least one of an access point feature, an access point service, or an access point vendor; and
   receiving a response message from at least one access point of the plurality of access points, the response message indicating that the at least one access point has the access point feature, is associated with the access point service, or is associated with the access point vendor.

2. The method of claim 1, wherein the request message includes a receiver address field, a transmitter address field, and a network address field, the address is located in at least one of the receiver address field or the network address field.

3. The method of claim 2, wherein the address is located in the receiver address field and the receiver address field further includes a group bit set to 1, wherein the address is located in the network address field and the network address field includes a group bit set to 0, or wherein the address is located in the receiver address field and the network address field, the receiver address field has a first group bit set to 1, and the network address field has a second group bit set to 0.

4. The method of claim 1, wherein the address in the request message indicates a query for a specific service or a set of services provided by an access point.

5. The method of claim 1, wherein the address in the request message indicates a query for a group of devices identified by the address.

6. The method of claim 1, wherein the request message further comprises a query of one or more capabilities associated with the access point feature or the access point vendor indicated by the address.

7. The method of claim 1, wherein the address is different from a second address in which bits of the second address are all set to 1.

8. The method of claim 1, further comprising determining the address for transmitting the request message.

9. The method of claim 8, wherein the determining the address comprises:
   determining the access point feature, the access point service, or the access point vendor to query; and
   selecting the address reserved for the access point feature, the access point service, or the access point vendor.

10. The method of claim 1, wherein the request message is a probe request and the response message is a probe response.

11. The method of claim 1, wherein the request message comprises an identifier (ID) indicating that the request message is a generic advertisement service (GAS) request frame requesting the at least one of the access point feature, the access point service, or the access point vendor.

12. The method of claim 1, wherein the response further comprises information associated with the access point feature, the access point service, or the access point vendor.

13. An apparatus for wireless communication, comprising:
- means for transmitting a request message to a plurality of access points, the request message being transmitted to and comprising an address reserved for at least one of an access point feature, an access point service, or an access point vendor; and
- means for receiving a response message from at least one access point of the plurality of access points, the response message indicating that the at least one access point has the access point feature, is associated with the access point service, or is associated with the access point vendor.

14. The apparatus of claim 13, wherein the address in the request message indicates a query for a specific service or a set of services provided by an access point.

15. The apparatus of claim 13, further comprising means for determining the address for transmitting the request message.

16. The apparatus of claim 15, wherein the means for determining the address is configured to:
- determine the access point feature, the access point service, or the access point vendor to query; and
- select the address reserved for the access point feature, the access point service, or the access point vendor.

17. An apparatus for wireless communication, comprising:
- a memory; and
- at least one processor coupled to the memory and configured to:
  - transmit a request message to a plurality of access points, the request message being transmitted to and comprising an address reserved for at least one of an access point feature, an access point service, or an access point vendor; and
  - receive a response message from at least one access point of the plurality of access points, the response message indicating that the at least one access point has the access point feature, is associated with the access point service, or is associated with the access point vendor.

18. The apparatus of claim 17, wherein the request message includes a receiver address field, a transmitter address field, and a network address field, the address is located in at least one of the receiver address field or the network address field.

19. The apparatus of claim 18, wherein the address is located in the receiver address field and the receiver address field further includes a group bit set to 1, wherein the address is located in the network address field, and the network address field includes a group bit set to 0, or wherein the address is located in the receiver address field and the network address field, the receiver address field has a first group bit set to 1, and the network address field has a second group bit set to 0.

20. The apparatus of claim 17, wherein the address in the request message indicates a query for a specific service or a set of services provided by an access point.

21. The apparatus of claim 17, wherein the address in the request message indicates a query for a group of devices identified by the address.

22. The apparatus of claim 17, wherein the request message further comprises a query of one or more capabilities associated with the access point feature or the access point vendor indicated by the address.

23. The apparatus of claim 17, wherein the address is different from a second address in which bits of the second address are all set to 1.

24. The apparatus of claim 17, wherein the at least one processor is further configured to determine the address for transmitting the request message.

25. The apparatus of claim 24, wherein the at least one processor is configured to determine the address by:
- determining the access point feature, the access point service, or the access point vendor to query; and
- selecting the address reserved for the access point feature, the access point service, or the access point vendor.

26. The apparatus of claim 17, wherein the address is included in a wireless local area network (WLAN) standard or is vendor specific.

27. The apparatus of claim 17, wherein the request message is a probe request and the response message is a probe response.

28. The apparatus of claim 17, wherein the request message comprises an identifier (ID) indicating that the request message is a generic advertisement service (GAS) request frame requesting the at least one of the access point feature, the access point service, or the access point vendor.

29. The apparatus of claim 17, wherein the response further comprises information associated with the access point feature, the access point service, or the access point vendor.

30. A computer-readable medium of a station storing executable code, comprising code to:
- transmit a request message to a plurality of access points, the request message being transmitted to and comprising an address reserved for at least one of an access point feature, an access point service, or an access point vendor; and
- receive a response message from at least one access point of the plurality of access points, the response message indicating that the at least one access point has the access point feature, is associated with the access point service, or is associated with the access point vendor.

* * * * *